J. D. WEEKES.
VEHICLE GEAR.
APPLICATION FILED APR. 14, 1908.
904,822.
Patented Nov. 24, 1908.
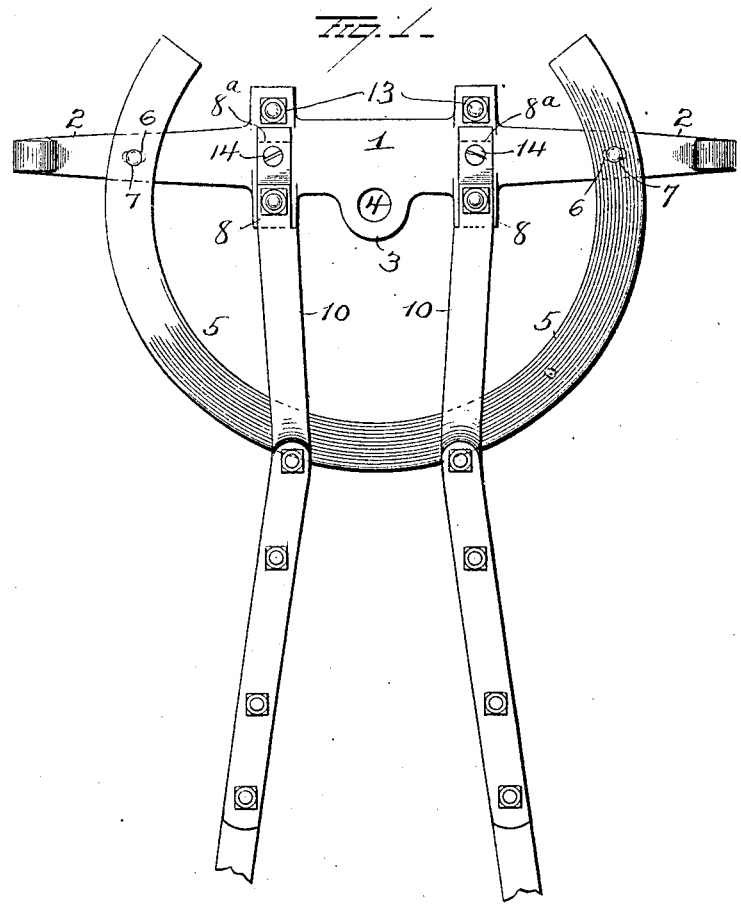
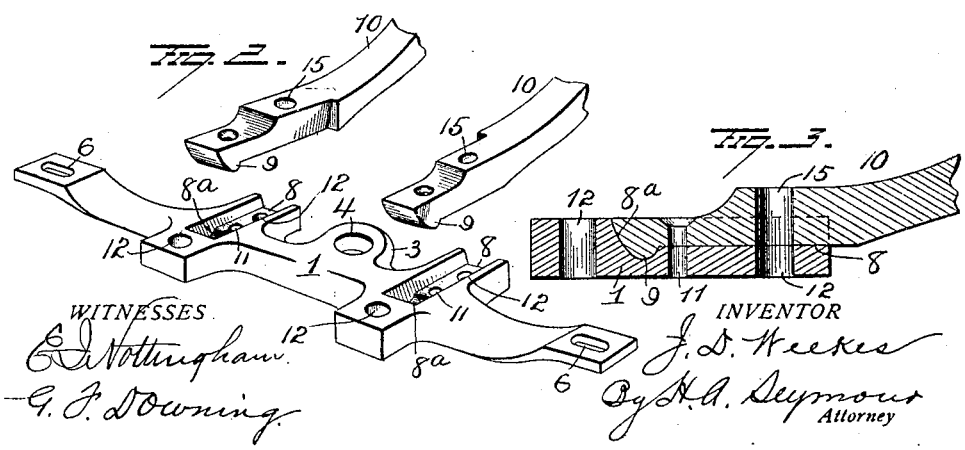

UNITED STATES PATENT OFFICE.

JOHN DUDLEY WEEKES, OF NORTHUMBERLAND, PENNSYLVANIA.

VEHICLE-GEAR.

No. 904,822.   Specification of Letters Patent.   Patented Nov. 24, 1908.

Application filed April 14, 1908. Serial No. 427,001.

*To all whom it may concern:*

Be it known that I, JOHN D. WEEKES, of Northumberland, in the county of Northumberland and State of Pennsylvania, have invented certain new and useful Improvements in Vehicle-Gear; and I do hereby declare the following to be a full, clear, and exact description of the invention, such as will enable others skilled in the art to which it appertains to make and use the same.

My invention relates to an improvement in vehicle gear, the object being to provide simple and effective means for connecting the reach irons to the head block plate, whereby all lateral and longitudinal strains will be borne by the parts themselves and not by the devices securing them together.

With these ends in view my invention consists in the parts and combinations of parts as will be more fully described and pointed out in the claims.

In the accompanying drawings, Figure 1 is a bottom plan view showing the parts assembled, Fig. 2 is a view in perspective of the parts detached, and Fig. 3 is a view in section through the plate and one reach iron.

1 represents the head block plate secured to the lower face of the head block 2.

The plate 1 may be provided with a central king bolt opening, of the usual form but it is preferably provided with a rearward extension 3 having the king bolt opening 4 therein as shown, the fifth wheel members, the upper one 5 of which is shown, being concentric with the king bolt opening.

The head block plate 1 is provided at its ends with holes 6, through which the bolts 7 pass to secure the fifth wheel member 5 to the head block, and which assists in securing the head block plate 1 to the head block.

The plate 1 is provided on its lower face on opposite sides of the king bolt opening 4, and equi-distant from the latter, with the rectangular recessed seats 8, the latter being prolonged rearwardly of the plate 1, as clearly shown in the drawing. These seats are open at their rear ends and are enlarged upwardly at their front ends as shown at 8ª to receive the upwardly projecting lips 9 on the upper surfaces of the front ends of the reach irons 10, and are also provided with the holes 11 and 12, the former of which is for the passage of a securing screw, and the latter for one member of the U-shaped clips 13 which secure the head block plate to the head block.

The front ends of the reach irons 10 are shaped to fit snugly within the recessed seats in the head block plate, and when in place are supported and sustained by the walls of the seats and the lips 9 against any longitudinal and lateral movements, thus relieving the securing screws and clips from all strains, and producing a structure, as rigid, for all necessary purposes as an integral structure.

The plate and reach irons are secured in their assembled relation by the screws 14 and when secured to the head block are further secured together by the clips which pass through the holes 12 and 15, the latter being located in advance of the recessed seat.

By making the irons separate from the plate, I simplify and cheapen the cost of construction, and by the means of the particular connection between the parts I take all the strains from the screws 14 which are primarily designed for holding the parts assembled, and also from the clips which secure the assembled parts to the head block.

It is evident that many slight changes might be resorted to in the relative arrangement of parts shown and described without departing from the spirit and scope of my invention hence I would have it understood that I do not wish to confine myself to the exact construction of parts shown and described, but, Having fully described my invention what I claim as new and desire to secure by Letters-Patent, is:—

1. The combination with a head block plate having a king bolt opening and provided on its lower face on opposite sides of said opening with rectangular recessed seats closed at their sides and front ends, the said recesses being enlarged upwardly adjacent to said front ends, of reach irons shaped to conform to the recessed seats and each provided with an upwardly projecting lip adapted to enter the enlargement in the recess and means for securing the reach irons and head block plate to the head block.

2. The combination with a head block plate having a king bolt opening, and provided on its lower face with rectangular recessed seats, the latter being prolonged rearwardly of the plate, and the recesses enlarged upwardly adjacent to their closed front ends, of reach irons shaped to conform to the recessed seats, each iron being provided with an upwardly projecting lip adapted to enter the enlargement in the recess and means for securing the reach irons and head block plate to the head block.

3. The combination with a head block plate having a king bolt opening therein, and provided on its lower face on opposite sides of said opening with recessed seats closed at their front ends, the said recesses being enlarged upwardly adjacent to said closed ends and having side walls throughout the full length of the seats, of reach irons shaped to conform to the recessed seats and confined between said side walls each reach iron provided with an upwardly projecting lip adapted to enter the enlarged portion of its seat, and a screw for locking each iron in its assembled position to the head block plate.

In testimony whereof, I have signed this specification in the presence of two subscribing witnesses.

JOHN DUDLEY WEEKES.

Witnesses:
   CHAS. H. DODGE,
   ELSIE MCNALLY.